(12) United States Patent  (10) Patent No.: US 6,651,625 B1
Knight et al.  (45) Date of Patent: Nov. 25, 2003

(54) FUEL SYSTEM AND PUMP SUITABLE FOR USE THEREIN

(75) Inventors: Andrew Roger Knight, Four Ashes (GB); George Frankl, Kenton (GB); Colin Thomas Timms, Harrow Weald (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/309,926

(22) Filed: May 11, 1999

(30) Foreign Application Priority Data

May 15, 1998 (GB) ............................................. 9810327

(51) Int. Cl.$^7$ ............................................. F02M 37/04
(52) U.S. Cl. ...................... 123/446; 123/506
(58) Field of Search ................ 123/506, 501, 123/467, 446, 458, 500, 456

(56) References Cited

U.S. PATENT DOCUMENTS

| | | | | |
|---|---|---|---|---|
| 4,036,192 A | * | 7/1977 | Nakayama | 123/467 |
| 4,246,876 A | * | 1/1981 | Bouwkamp et al. | 123/467 |
| 4,249,497 A | * | 2/1981 | Eheim et al. | 123/446 |
| 4,336,781 A | * | 6/1982 | Overfield | 123/467 |
| 4,359,032 A | * | 11/1982 | Ohie | 123/458 |
| 4,385,614 A | * | 5/1983 | Eheim et al. | 123/506 |
| 4,653,455 A |   | 3/1987 | Eblen et al. | |
| 4,662,315 A |   | 5/1987 | Sommer | |
| 4,662,338 A | * | 5/1987 | Itoh et al. | 123/467 |
| 5,390,692 A | * | 2/1995 | Jones et al. | 137/513.3 |
| 5,551,398 A |   | 9/1996 | Gibson et al. | |
| 5,732,679 A | * | 3/1998 | Takahashi et al. | 123/467 |
| 5,771,865 A | * | 6/1998 | Ishida | 123/467 |
| 5,832,899 A | * | 11/1998 | Soteriou | 123/456 |
| 5,893,350 A | * | 4/1999 | Timms | 123/467 |
| 6,045,120 A | * | 4/2000 | Tarr et al. | 251/282 |

FOREIGN PATENT DOCUMENTS

| | | |
|---|---|---|
| DE | 35 23 536 | 3/1986 |
| DE | 42 36 882 | 4/1994 |
| EP | 0 501 463 | 9/1992 |
| EP | 0 845 791 A2 | 6/1998 |
| EP | 0 987 431 A2 | 3/2000 |
| WO | WO 93/23667 | 11/1993 |

* cited by examiner

Primary Examiner—Carl S. Miller
(74) Attorney, Agent, or Firm—Michael Best & Friedrich LLP

(57) ABSTRACT

A fuel system comprises a fuel pump arranged to deliver fuel to a single fuel injector. The fuel pump and injector are physically spaced apart from one another, a high pressure fuel line being used to convey fuel between the fuel pump and the injector. The fuel pump is controllable to control the timing of commencement of fuel pressurization. The injector is controllable to control the timing of fuel delivery. A controller is arranged to control the operation of the fuel pump and the injector. The invention further relates to a fuel pump suitable for use in such a fuel system.

24 Claims, 3 Drawing Sheets

FUEL SYSTEM AND PUMP SUITABLE FOR USE THEREIN

This invention relates to a fuel system for use in delivering fuel under high pressure to a cylinder of an associated compression ignition internal combustion engine, and to a fuel pump suitable for use in such a system.

In order to ensure that the level of emissions produced by an engine falls within acceptable levels, it is desirable to be able to control the fuel pressure at which fuel is injected to a cylinder of an engine independently of the timing of fuel delivery. Where the fuel system includes injectors with integral fuel pumps, this has been achieved by using separate valves to control the injection pressure and the timing of injection. The valve controlling injection pressure is typically mounted upon the side of the injector housing with the result that the dimensions of the injector are relatively large thus the injector may not be suitable for use in some applications. Further, the location of the valve results in a relatively large dead volume which reduces responsiveness and the passages connecting the valve to the remainder of the injector are relatively difficult to produce.

According to the present invention there is provided a fuel system comprising a fuel pump arranged to deliver fuel to a single fuel injector, the fuel pump being operable to control the timing of commencement of fuel pressurization, the injector being controllable to control the timing of fuel injection, the fuel pump and injector being spaced apart from one another, a high pressure fuel line interconnecting the fuel pump and the injector, and a controller controlling the operation of the fuel pump and the injector.

The controller is conveniently arranged to control operation of the fuel pump to commence pressurization at an instant a predetermined time interval in advance of the time at which injection is to commence. The commencement of pressurization is conveniently achieved by closing a control valve. The control valve may include a valve member which extends and is moveable along an axis generally parallel to or generally coaxial with the pumping plunger of the fuel pump.

In an alternative arrangement, the controller may control the injection pressure by controlling the quantity of fuel supplied to the fuel pump. In a further alternative, the fuel pump may include a spill valve controlling the termination of injection.

The invention further relates to a fuel pump comprising a plunger reciprocable within a bore to deliver fuel to an outlet connector, and a control valve controlling the timing of pressurization of fuel by the pump, the control valve comprising a valve member slidable within a bore which extends in a direction generally parallel to an axis of the bore within which the plunger is reciprocable. The bores are conveniently generally coaxial.

By locating the control valve generally coaxially within the pump, manufacture of the pump can be simplified, and the dead volume within the pump can be reduced. Further, the pump is relatively compact compared to an arrangement in which the axis of the bore of the valve extends perpendicularly to the axis of the plunger bore, thus simplifying installation and increasing the range of applications in which the pump can be used.

The invention will further be described, by way of example, with reference to the accompanying drawings, in which.

Figure 1:
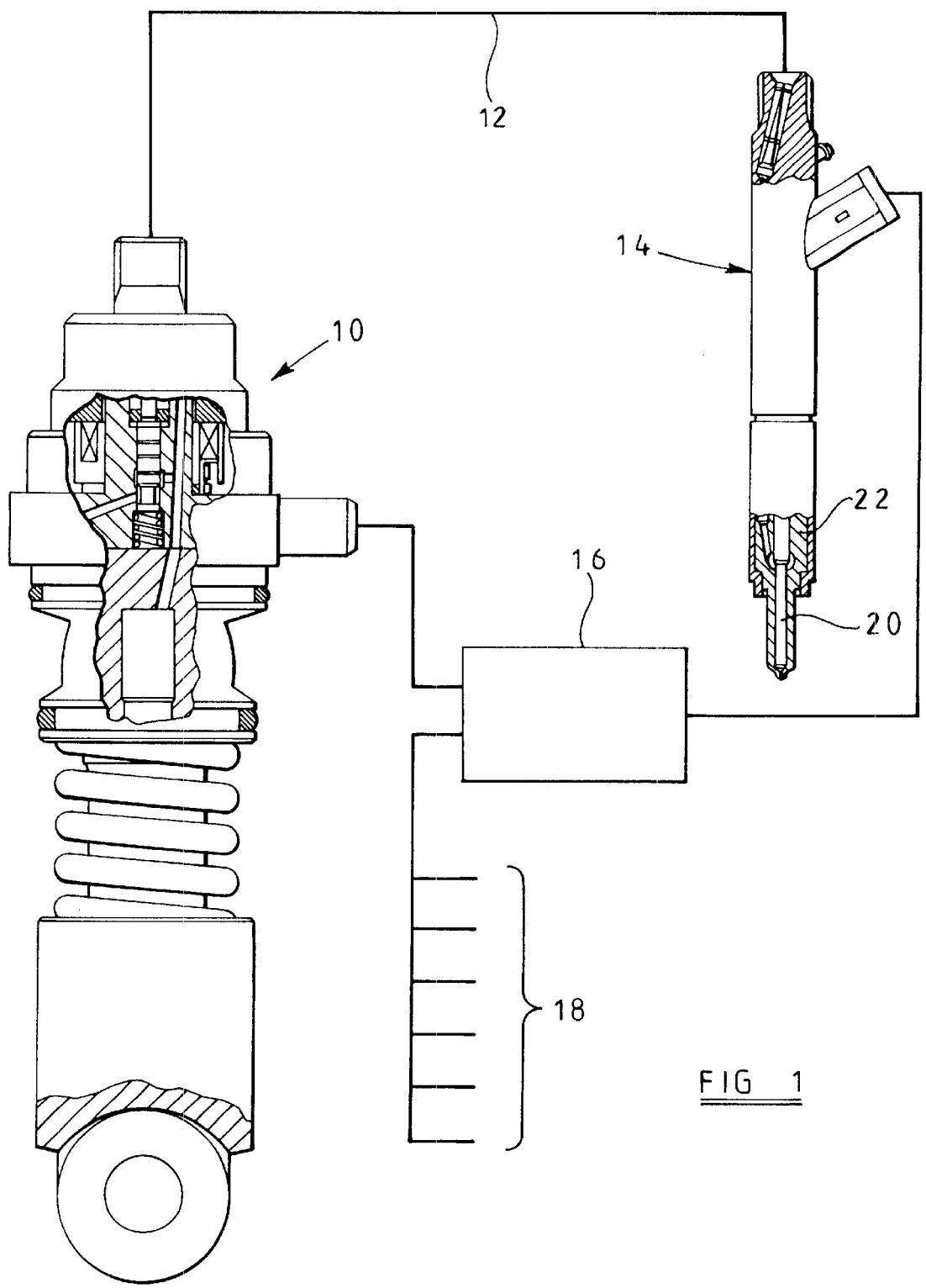
FIG. 1 is a schematic view of a fuel system in accordance with an embodiment of the invention.

The fuel system illustrated in FIG. 1 comprises a unit fuel pump 10 (illustrated in more detail in FIG. 2), the outlet of which communicates through a high pressure fuel line 12 with the inlet of an electronically controlled fuel injector 14. The pump 10 and the injector 14 are both controlled electronically by a control unit 16. The control unit 16 receives signals from a plurality of sensors 18 which monitor, for example, engine speed, position and temperature. The signals supplied to the control unit 16 by the sensors 18 are used in controlling the operation of the fuel system to appropriately control the pressure of fuel supplied to the injector 14 and the timing at which injection of fuel to a cylinder of an associated engine takes place.

Figure 3:
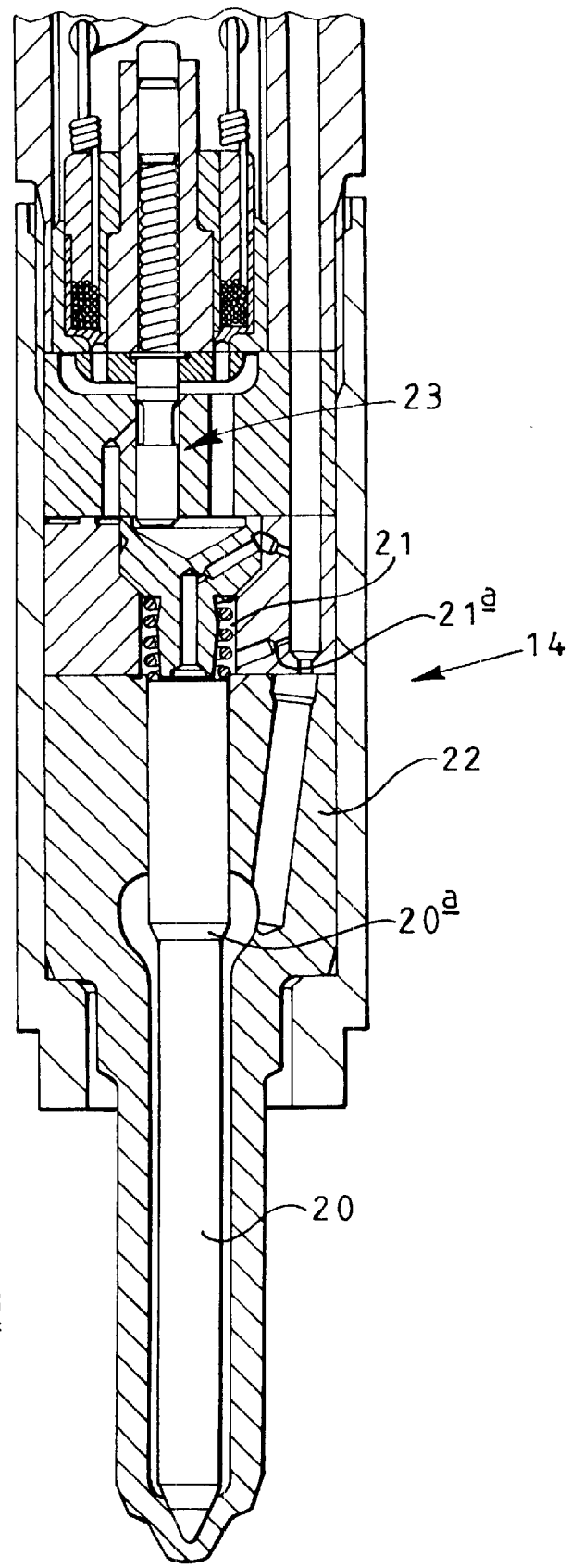
FIG. 3 is a sectional view illustrating an injector suitable for use in the fuel system.

One type of fuel injector suitable for use in the fuel system illustrated in FIG. 1 is shown in FIG. 3 and comprises a valve needle 20 slidable within a bore formed in a nozzle body 22. The needle 20 includes angled thrust surfaces 20a orientated such that the application of fuel under high pressure thereto from the high pressure fuel line 12 applies a force to the valve needle 20 urging the valve needle 20 out of engagement with a seating. The valve needle 20 further defines, with part of the injector housing, a control chamber 21 which is supplied with fuel from the high pressure fuel line 12 through a restricted passage 21a, an electromagnetically operable needle control valve 23 being arranged to control communication between the control chamber 21 and a low pressure drain.

In use, when fuel under pressure is supplied to the injector 14, and when the electromagnetically operable needle control valve 23 is closed, the fuel pressure within the control chamber 21 is substantially equal to that applied to the thrust surfaces 20a of the valve needle 20. The dimensions of the exposed parts of the valve needle 20 are such that the effective areas exposed to fuel under pressure are substantially equal thus the nett force acting upon the valve needle as a result of the high pressure fuel is small. The valve needle 20 is biased by a spring into engagement with the seating.

Upon energising the needle control valve 23 to open the needle control valve and permit fuel to flow from the control chamber 21 to the low pressure drain, the fuel pressure within the control chamber falls thus reducing the magnitude of the force urging the valve needle towards its seating and permitting the valve needle 20 to lift from its seating under the action of the fuel acting upon the thrust surfaces of the needle. Such movement of the valve needle permits fuel to flow past the seating to one or more outlet openings, and through the opening(s) to be injected to the engine cylinder.

In order to terminate injection, the needle control valve 23 is closed, the continued flow of fuel through the restricted passage to the control chamber 21 permitting the fuel pressure within the control chamber to increase. The increased fuel pressure within the control chamber 21 increases the magnitude of the force urging the valve needle 20 towards its seating, and a point will be reached beyond which the valve needle 20 returns into engagement with its seating, thus terminating the supply of fuel to the cylinder of the associated engine.

It will be apparent from the description hereinbefore that the operation of the needle control valve of the injector controls the timing at which fuel injection takes place, but does not control the injection pressure.

Figure 2:
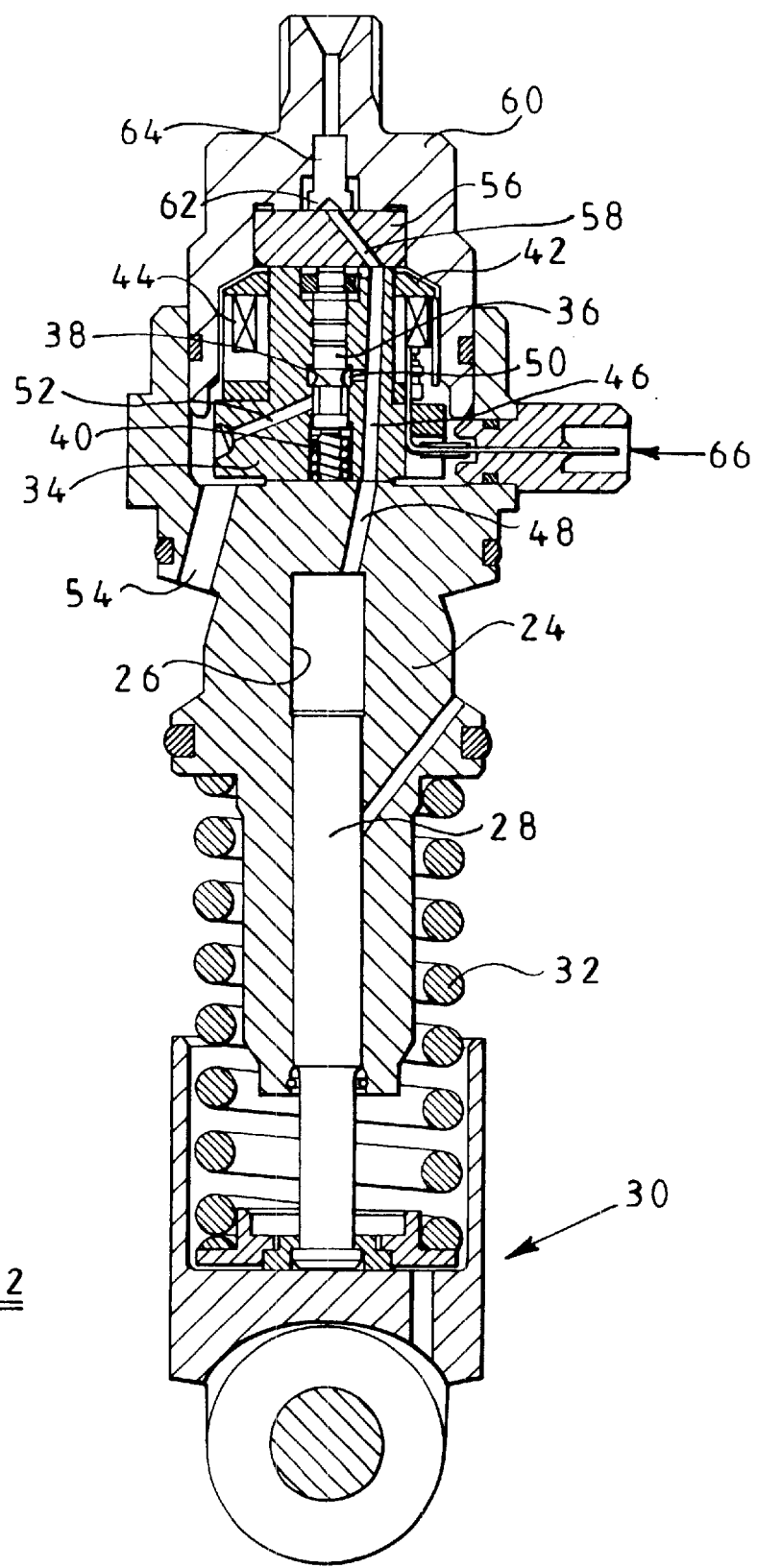
FIG. 2 is a sectional view of a fuel pump suitable for use in the fuel system of FIG. 1.

The unit pump 10 illustrated in FIGS. 1 and 2 comprises a pump housing 24 defining a bore 26 within which a pumping plunger 28 is reciprocable under the action of a cam and tappet arrangement 30 which acts against the action of a return spring 32.

The end of the pump housing 24 remote from the cam and tappet arrangement 30 defines a cylindrical recess within which a valve housing 34 is located. The valve housing 34 includes an axially extending through bore within which a pressure control valve member 36 is slidable. The through bore of the valve housing 34 defines a seating with which a region 38 of the pressure control valve member 36 is engageable. A helical spring 40 is engaged between the pressure control valve member 36 and the end surface of the pump housing 24 remote from the cam and tappet arrangement 30 to bias the pressure control valve member 36 towards a position in which the region 38 is out of engagement with the seating. The end of the pressure control valve member 36 remote from the spring 40 carries an armature 42 which is moveable under the influence of a magnetic field generated, in use by an actuator 44 carried by the valve housing 34. The actuator 44 and armature 42 are arranged such that energization of the actuator 44 causes movement of the pressure control valve member 36 against the action of the spring 40 to move the region 38 into engagement with the seating.

A drilling 46 extends within the valve housing 34, the drilling 46 communicating with a drilling 48 provided in the pump housing 24 which communicates with the bore 26. The drilling 46 communicates with an annular chamber 50 defined between a reduced diameter region of the pressure control valve member 36 and the bore within which the pressure control valve member 36 is slidable located on one axial side of the seating, a passage 52 communicating with a chamber located on the other axial side of the seating, the passage 52 communicating with a low pressure drain reservoir through a fill and return opening 54.

The end of the valve housing 34 remote from the pump housing 24 engages a distance piece 56 through which a passage 58 is formed which communicates with the drilling 46. The distance piece 56 and valve housing 34 are secured to the pump housing 24 by a connector body 60 which is in screw-threaded engagement with the pump housing 24.

A snubber valve member 62 is located within a chamber defined between the connector body 60 and the distance piece 56, a spring 64 biasing the snubber valve member 62 into engagement with the distance piece 56 to close the end of the passage 58.

The end of the connector body 60 remote from the pump housing 24 is shaped to define a connector port to which an appropriate connector can be connected to secure the high pressure fuel line 12 to the unit pump.

An electrical connector 66 is mounted on the pump housing 24 to permit electrical connection between the actuator 44 and the control unit 16 thus permitting the pressure control valve defined, in part, by the pressure control valve member 36 to be operated by the control unit 16.

In use, in the position illustrated, the plunger 28 occupies an inner position. The actuator 44 is not energized, thus the pressure control valve member 36 occupies a position in which the region 38 does not engage its seating. Movement of the cam and tappet arrangement 30 permits outward movement of the plunger 29 under the action of the return spring 32, drawing fuel at relatively low pressure from the fuel reservoir through the pressure control valve to the bore 26. The fuel pressure within the bore 26 is relatively low. The fuel pressure within the high pressure fuel line 12 is also relatively low, but may be at a level higher than that within the bore 26 as a result of the action of the snubber valve 62 restricting the rate at which fuel can return from the high pressure fuel line 12 to the fuel pump. The fuel pressure applied to the injector 14 is therefore relatively low, although it may be slightly higher than that within the bore 26 of the fuel pump. The needle control valve of the injector 14 is closed to ensure that the fuel pressure within the control chamber 21 thereof is substantially equal to that applied to the thrust surfaces of the valve needle 20, thus ensuring that injection does not take place.

The movement of the cam and tappet arrangement 30 results, subsequently, in the plunger 28 reaching its outermost position and commencing inward movement. Whilst the pressure control valve of the pump remains de-energized, the inward movement of the pumping plunger 28 simply displaces fuel back to the low pressure drain reservoir, and thus does not result in pressurization of the high pressure fuel line 12. When it is determined that pressurization of the fuel should commence, a signal is applied by the control unit 16 to the actuator 44 to move the region 38 of the pressure control valve member 36 into engagement with its seating, thus terminating the return flow of fuel from the bore 26 to the low pressure drain reservoir. Continued inward movement of the pumping plunger 28 thus results in pressurization of the fuel within the bore 26, the passages which communicate therewith and the high pressure fuel line 12. As a result of the pressurization of the fuel within the high pressure fuel line 12, the fuel pressure applied to the injector 14 increases, but as the needle control valve 23 of the injector 14 is closed, the fuel pressure within the control chamber 21 and that applied to the thrust surfaces 20a of the valve needle 20 remain substantially equal thus ensuring that the valve needle 20 remains in engagement with its seating thus injection does not occur.

When injection is to commence, the needle control valve 23 of the injector 14 is opened to relieve the pressure within the control chamber 21 thus permitting movement of the needle 20 as described hereinbefore. Injection continues until the control valve of the injector 14 is closed, the movement of the injector needle 20 which occurs subsequently, as described hereinbefore, terminating the supply of fuel to the cylinder of the associated engine. If a further injection is required, then the needle control valve of the injector is controlled accordingly to commence and subsequently terminate that further injection.

Once injection has been completed, the pressure control valve of the fuel pump 10 is de-energized, and as a result the pressure control valve member 36 moves out of engagement with the seating under the action of the spring 40 thus permitting fuel to flow past the pressure control valve to the low pressure drain reservoir. Although the fuel pressure within the bore 26 is relieved quickly, the presence of the snubber valve 62 reduces the rate at which the fuel pressure from the high pressure fuel line 12 is relieved to reduce the risk of cavities being drawn in the high pressure fuel line 12 and to reduce the generation and reflection of pressure waves along the high pressure fuel line 12. The maintenance of pressure within the line 12 further increases the efficiency of the system by reducing the wastage involved in totally re-pressurizing the line 12 prior to each subsequent injection.

Inward movement of the pumping plunger 28 continues until the plunger 28 reaches its innermost position whereafter the plunger 28 commences outward movement under the action of the spring 32 as described hereinbefore.

It will be appreciated that the actuation of the pressure control valve of the unit pump 10 controls the timing at which pressurization commences, and by selecting an appropriate time for commencement of pressurization prior to the time at which injection is to commence, the operation of the pressure control valve of the pump 10 controls the injection pressure. Clearly, the use of separate control valves within the pump 10 and injector 14 permits independent control of the injection pressure and the timing of injection.

By locating the control valve of the pump 10 in the manner described hereinbefore in which the valve member thereof extends coaxially with the plunger 28, the unit pump 10 is of relatively simple construction, is of relatively low dead volume, and installation of the pump into an engine is relatively simple.

It will be appreciated that the fuel system in accordance with the invention may include an alternative type of electronically controlled injector to that described hereinbefore. Further, the fuel pump may be replaced by an alternative type of fuel pump, for example a fuel pump in which the quantity of fuel supply thereto is metered to permit control of the fuel injection pressure. Further, the termination of fuel injection may be controlled by opening the pressure control valve of the fuel pump rather than by closing the needle control valve of the injector, if desired.

In the description hereinbefore, the bore within which the valve member 36 is slidable is coaxial with the bore 26. It will be appreciated that these bores could extend generally parallel to, but offset from, one another, or that the bores may be slightly angularly misaligned, and that such modifications do not depart from the present invention.

We claim:

1. A fuel system comprising:
   a unit fuel pump comprising an outlet, a pump housing, and a pumping plunger which is reciprocal within a bore provided in the pump housing to cause pressurization of fuel within a pumping chamber,
   a pressure control valve arranged within the pump housing and operable under the control of a first actuator to control a return flow of fuel between the pumping chamber and a low pressure drain so as to control the timing of commencement of fuel pressurization,
   a fuel injector associated with the unit fuel pump and comprising an injector housing and only one high pressure fuel inlet defined within the injector housing, wherein the outlet of the unit fuel pump is interconnected only to the fuel inlet of the fuel injector, such that the unit fuel pump supplies a direct flow of fuel uniquely to the fuel injector and to no other fuel injector, a valve needle for controlling fuel injection through an injector outlet, a control chamber for fuel defined within the injector housing, whereby the pressure of fuel within the control chamber applies a force to the valve needle of the fuel injector, a needle control valve arranged within the injector housing, and having a valve member, wherein the needle control valve has a second actuator, independent of the first actuator, to control the timing of fuel injection independently of the timing of commencement of pressurization,
   the fuel injector further comprising a supply passage defined, in part, within the injector housing, the supply passage receiving fuel from the high pressure fuel inlet and being arranged to deliver fuel under high pressure to the control chamber,
   the unit fuel pump being in direct communication with only the inlet of the fuel injector and the low pressure drain and the pump housing and the injector housing being spaced apart from one another such that only one separate high pressure fuel line interconnects the pump housing and the injector housing, a controller being provided to control the operation of the unit fuel pump and of the fuel injector.

2. A fuel system as claimed in claim 1, wherein the controller is arranged to control operation of the fuel pump to commence pressurization at an instant a predetermined time interval in advance of the time at which injection is to commence.

3. A fuel system as claimed in claim 1, wherein the pressure control valve includes a valve member which extends and is moveable along an axis generally parallel to an axis of a pumping plunger of the fuel pump.

4. A fuel system as claimed in claim 3, wherein the axis along which the valve member is moveable is generally coaxial with the axis of the pumping plunger.

5. A fuel system as claimed in claim 1, wherein the pressure control valve is further operable to relieve the fuel pressure applied to the fuel injector.

6. A fuel system as claimed in claim 1, further comprising a snubber valve located adjacent the outlet of the fuel pump.

7. A fuel system as claimed in claim 1, wherein the needle control valve of the fuel injector is electromagnetically actuable.

8. A fuel system as claimed in claim 1, wherein the fuel injector is provided with a floe restriction arranged such that, in use, during injection of fuel, the fuel pressure at an outlet of the injector falls.

9. A fuel pump for use in a fuel system as claimed in claim 1, wherein the fuel pump is arranged to deliver fuel to an outlet connector for connection with the high pressure fuel line.

10. A fuel pump as claimed in claim 9, wherein the further bore within which the valve member is slidable is generally coaxial with the bore within which the pumping plunger is reciprocable.

11. A fuel pump as claimed in claim 9, wherein the pressure control valve is further operable to relieve the outlet pressure of the fuel pump.

12. A fuel pump as claimed in claim 9, further comprising a snubber valve located adjacent the outlet of the pump.

13. A fuel pump as claimed in claim 1, wherein the supply passage delivers fuel to the control chamber through a restricted passage.

14. A fuel system as claimed in claim 1, wherein the pressure control valve is electrically actuable.

15. A fuel system as claimed in claim 14, wherein the pressure control valve is electromagnetically actuable.

16. A fuel system as claimed in claim 1, wherein the injector is electronically controlled.

17. A fuel system as claimed in claim 1, wherein the outlet of the fuel pump is arranged such that it is coaxial with the plunger.

18. A fuel system as claimed in claim 1, wherein the control chamber is defined, in part, by a surface of the valve needle.

19. A fuel system as claimed in claim 1, wherein the valve member has an axis which is offset axially from the valve needle.

20. A fuel system as claimed in claim 1, wherein the valve member has an axis which is substantially parallel to the valve needle.

21. A fuel system comprising:
   a unit pump comprising an outlet, a pump housing, and a pumping plunger which is reciprocal within a bore provided in the pump housing to cause pressurisation of fuel within a pumping chamber,
   a pressure control valve arranged within the pump housing and operable under the control of a first actuator to control a return flow of fuel between the pumping chamber and a low pressure drain so as to control the timing of commencement of fuel pressurisation, a fuel injector associated with the unit pump, wherein the fuel injector comprises an injector housing, only one high pressure fuel inlet defined within the injector housing, a valve needle for controlling fuel injection through an injector outlet, a control chamber for fuel defined within the injector housing, whereby the pressure of fuel defined with the control chamber applies a force to the valve needle of the fuel injector, a needle control valve arranged within the injector housing, and having a valve member, wherein the needle control valve has a second actuator, independent of the first actuator, to control the timing of fuel injection independently of the timing of commencement of pressurisation, the fuel injector further comprising a supply passage defined, in part, within the injector housing, the supply passage receiving fuel from the inlet and being arranged to deliver fuel under high pressure to the control chamber, the unit pump operable to discharge fuel only to the inlet of the associated fuel injector, and to no other fuel injector, and the pump housing and the injector housing being spaced apart from one another such that only one separate high pressure fuel line interconnects the pump outlet and the injector inlet, a controller being provided to control the operation of the unit pump and of the fuel injector.

22. A fuel system of the type in which each of a plurality of fuel pumps are arranged to supply fuel at high pressure to a respective fuel injector through an associated high pressure fuel line, the fuel system comprising:

a first one of said fuel pumps comprising an outlet, a pump housing, and a pumping plunger which is reciprocal within a bore provided in the pump housing to cause pressurisation of fuel within a pumping chamber, a pressure control valve arranged within the pump housing and operable under the control of a first actuator to control a return flow of fuel between the pumping chamber and a low pressure drain so as to control the timing of commencement of fuel pressurisation, a first one of said fuel injectors associated with the respective fuel pump and comprising an injector housing and only one high pressure fuel inlet defined within the injector housing, a valve needle for controlling fuel injection through an injector outlet, a control chamber for fuel defined within the injector housing, whereby the pressure of fuel within the control chamber applies a force to the valve needle of the fuel injector, a needle control valve arranged within the injector housing, and having a valve member, wherein the needle control valve has a second actuator, independent of the first actuator, to control the timing of fuel injection independently of the timing of commencement of pressurisation, the fuel injector further comprising a supply passage defined, in part, within the injector housing, the supply passage receiving fuel from the inlet and being arranged to deliver fuel under high pressure to the control chamber, the outlet of said fuel pump being in direct communication with the inlet of the respective fuel injector, and the pump housing and the injector housing being spaced apart from one another such that the high pressure fuel line interconnects the pump outlet and the injector inlet, a controller being provided to control the operation of the fuel pump and of the fuel injector.

23. A fuel system comprising:

a pump means in the form of a unit pump comprising an outlet, a pump housing, a pumping plunger which is reciprocal within a bore provided in the pump housing to cause pressurisation of fuel within a pumping chamber, and a pressure control valve operable under the control of a first actuator to control a return flow of fuel between the pumping chamber and a low pressure drain so as to control the timing of commencement of fuel pressurisation, and an injection means in the form of a fuel injector, an injector housing in which only one high pressure fuel inlet is defined, a valve needle for controlling fuel injection through an injector outlet, a control chamber for fuel defined within the injector housing, whereby the pressure of fuel within the control chamber applies a force to the valve needle of the fuel injector, a needle control valve arranged within the injector housing, and having a valve member, wherein the needle control valve has a second actuator, independent of the first actuator, to control the timing of fuel injection independently of the timing of commencement of pressurisation, the fuel injector further comprising a supply passage defined, in part, within the injector housing, the supply passage receiving fuel from the inlet and being arranged to deliver fuel under high pressure to the control chamber, the pump means and the injection means being located at opposing ends of a high pressure fuel line interconnecting the pump and the inlet of the associated fuel injector so as to deliver a flow of fuel directly and uniquely to the injector inlet, and a controller being provided to control the operation of the pump means and of the injection means.

24. A fuel system comprising:

a unit pump comprising an outlet, a pump housing, and a pumping plunger which is reciprocal within a bore provided in the pump housing to cause pressurisation of fuel within a pumping chamber, a pressure control valve arranged within the pump housing and operable under the control of a first actuator to control a return flow of fuel between the pumping chamber and a low pressure drain so as to control the timing of commencement of fuel pressurisation, a fuel injector associated with the unit pump and comprising an injector housing and a fuel inlet defined within the injector housing, wherein the outlet of the unit pump is interconnected with the fuel inlet of the fuel injector, a valve needle for controlling fuel injection through an injector outlet, a control chamber for fuel defined within the injector housing, whereby the pressure of fuel within the control chamber applies a force to the valve needle of the injector, a needle control valve arranged within the injector housing, and having a valve member, wherein the needle control valve has a second actuator, independent of the first actuator, to control the timing of fuel injection independently of the timing of commencement of pressurisation, the fuel injector further comprising a supply passage defined, in part, within the injector housing, the supply passage receiving fuel from the inlet and being arranged to deliver fuel under high pressure to the control chamber, the fuel pump being in direct communication with only the inlet of the fuel injector and the low pressure drain, and the pump housing and the injector housing being spaced apart from one another such that only one separate high pressure fuel line interconnects the pump housing and the injector housing, a controller being provided to control the operation of the fuel pump and of the fuel injector.